US009961314B2

(12) United States Patent
Akiyama (10) Patent No.: US 9,961,314 B2
(45) Date of Patent: May 1, 2018

(54) ILLUMINATION DEVICE AND PROJECTOR (71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 554 days.

(21) Appl. No.: 14/374,085

(22) PCT Filed: Feb. 8, 2013

(86) PCT No.: PCT/JP2013/000721
§ 371 (c)(1),
(2) Date: Jul. 23, 2014

(87) PCT Pub. No.: WO2013/121765
PCT Pub. Date: Aug. 22, 2013

(65) Prior Publication Data
US 2014/0340588 A1 Nov. 20, 2014

(30) Foreign Application Priority Data

Feb. 16, 2012 (JP) .................................. 2012-031849

(51) Int. Cl.
*G02F 1/1335* (2006.01)
*H04N 9/31* (2006.01)
(Continued)

(52) U.S. Cl.
CPC ............. *H04N 9/3173* (2013.01); *F21V 5/00* (2013.01); *F21V 13/04* (2013.01);
(Continued)

(58) Field of Classification Search
CPC .. H04N 9/3197; H04N 9/3167; H04N 9/3173; H04N 5/7441; G03B 21/2073;
(Continued)

(56) References Cited

U.S. PATENT DOCUMENTS 5,491,525 A 2/1996 Yamasaki et al.
6,927,919 B2 * 8/2005 Hwang .................... G02B 3/08
359/640

(Continued)

FOREIGN PATENT DOCUMENTS

DE 36 29 253 A1 3/1988
JP H06-289394 A 10/1994
(Continued)

OTHER PUBLICATIONS

Dec. 4, 2013 International Search Report issued in International Application No. PCT/JP2013/000721.

*Primary Examiner* — Nathanael R Briggs
*Assistant Examiner* — William Peterson
(74) *Attorney, Agent, or Firm* — Oliff PLC (57) ABSTRACT

An illumination device (100) includes a solid-state light source device (10), a pickup lens unit (20) on which light from the solid-state light source device is incident, and a polarization conversion element (40). A lens (22) constituting the light exit surface of the pickup lens unit (20) is an aspherical lens having a light exit surface shaped like a rotationally symmetric shape centered on a light axis (40$ax$) when viewed from a direction of the light axis (40$ax$), and having a cross-section of an aspherical shape when cut with a plane parallel to the light axis (40$ax$). The light exit surface of the aspherical lens has a function of collimating and then emitting the light having been emitted from the center of the solid-state light source device (10) in an area near to the light axis (40$ax$), and emitting the light so as to converge toward the light axis in an area far from the light axis (40$ax$).

20 Claims, 8 Drawing Sheets

(51) Int. Cl.
  *G03B 21/20*   (2006.01)
  *G02B 27/09*   (2006.01)
  *G02B 27/28*   (2006.01)
  *G02B 19/00*   (2006.01)
  *F21V 5/00*    (2018.01)
  *F21V 13/04*   (2006.01)
  *H04N 5/74*    (2006.01)
  *G02B 27/30*   (2006.01)

(52) U.S. Cl.
  CPC ..... *G02B 19/0061* (2013.01); *G02B 27/0905* (2013.01); *G02B 27/285* (2013.01); *G03B 21/208* (2013.01); *G03B 21/2073* (2013.01); *H04N 5/7441* (2013.01); *H04N 9/3167* (2013.01); *G02B 27/283* (2013.01); *G02B 27/30* (2013.01)

(58) Field of Classification Search
  CPC .......... G03B 21/208; G02B 27/0905; G02B 27/285; G02B 27/283; G02B 27/30; G02B 19/0061; F21V 5/00; F21V 13/04

USPC .......................................................... 349/9
  See application file for complete search history.

(56)    References Cited

U.S. PATENT DOCUMENTS

7,448,774  B2      11/2008  Konuma
   7,580,192  B1 *    8/2009   Chu .......................... F21V 5/04
                                                                359/641
   2011/0157566 A1 *  6/2011   Akiyama ............... G02B 27/30
                                                                353/102

FOREIGN PATENT DOCUMENTS

JP      2002-048999 A     2/2002
   JP      A-2003-227906     8/2003
   JP      2005-031108 A     2/2005
   JP      A-2005-208571     8/2005
   JP      A-2007-171319     7/2007
   JP      2009-217060 A     9/2009
   JP      A-2010-72138      4/2010

* cited by examiner

ILLUMINATION DEVICE AND PROJECTOR

BACKGROUND

1. Technical Field

The present invention relates to an illumination device and a projector.

2. Related Art

Liquid crystal projectors are devices of modulating the light emitted from an illumination device in accordance with image information using a liquid crystal device, and then projecting the image thus obtained in an enlarged manner using a projection lens.

In recent years, as such liquid crystal projectors, extremely small projectors (so-called pico projectors) aiming at installation into portable equipment such as cellular phones or digital cameras have been under development.

Here, in a small-sized projector, it becomes necessary to simplify the configuration of the power supply circuit or the optical system, or to miniaturize these constituents.

As such a small-sized projector, there has been known a device having, for example, an illumination device composed of a solid-state light source device, a collimator lens unit, and a polarization conversion element, a liquid crystal panel as a light modulation device, and a projection optical system.

In this projector, since a single liquid crystal panel is used as the light modulation device, and further, the optical members such as integrator optical system, which is typically disposed between the light source and the polarization conversion element, are eliminated, it is possible to achieve reduction in size.

Incidentally, in the liquid crystal projectors, those arranged to separate the light from the collimator lens into a P-polarized light component and an S-polarized light component, and further convert, for example, the P-polarized light component into the S-polarized light component are used as the polarization conversion element (see, e.g., JP-A-2010-72138). An example of such a polarization conversion element is shown in FIG. 12.

Figure 12:
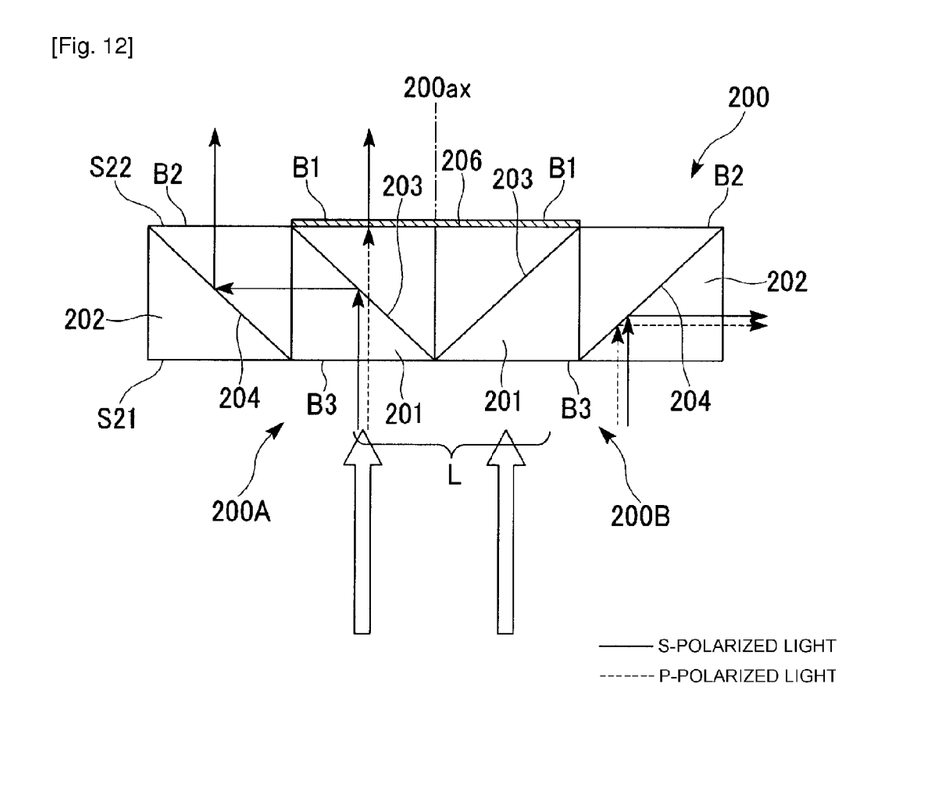
FIG. 12 is a schematic cross-sectional view showing a typical polarization conversion element.

The polarization conversion element 200 shown in FIG. 12 is for converting the light L input from a collimator lens unit not shown into the light composed of an S-polarized light component. The polarization conversion element 200 is composed of an optical block 200A and an optical block 200B. The configuration of the optical block 200A is the same as the configuration of the optical block 200B, and the optical block 200A and the optical block 200B are each composed of a polarization beam splitter 201 provided with a polarization splitting film 203, and an internal total reflection prism 202 provided with a total reflection film 204. Further, the optical block 200A and the optical block 200B are disposed symmetrically about an illumination light axis 200ax. Therefore, in the following explanation, only the optical block 200A will be explained, and the explanation related to the optical block 200B will be omitted.

Among the plurality of surfaces provided to the polarization conversion element 200, the surface on the side to which the light L emitted from the collimator lens unit is input is referred to as a light entrance surface S21 of the polarization conversion element 200. In the light entrance surface S21, the region corresponding to the light entrance surface of the polarization beam splitter 201 constitutes a light guide port B3 through which the light L is introduced into the polarization conversion element 200.

Further, among the plurality of surfaces provided to the polarization conversion element 200, the surface opposed to the light entrance surface of the polarization conversion element 200 is referred to as a light exit surface of the polarization conversion element 200. In the light exit surface S22 of the polarization conversion element 200, the region corresponding to the light exit surface of the polarization beam splitter 201 is referred to as a "first region B1." Further, in the light exit surface S22 of the polarization conversion element 200, the region corresponding to the light exit surface of the internal total reflection prism 202 is referred to as a second region B2." The first regions B1 are provided with a wave plate 206 for converting the P-polarized light component into the S-polarized light component.

The tilted surface located inside the polarization beam splitter 201 is provided with the polarization splitting film 203 for reflecting the S-polarized light component, which is input from the light guide port B3 of the light entrance surface S21, in a direction perpendicular to the illumination light axis 200ax, and at the same time transmitting the P-polarized light input from the light guide port B3. Further, the tilted surface located inside the internal total reflection prism 202 is provided with a total reflection film 204 for reflecting the S-polarized light component, which is reflected by the polarization splitting film 203, in a direction parallel to the illumination light axis 200ax.

In such a polarization conversion element 200, the light L emitted from the collimator lens unit proceeds to the inside of the polarization conversion element 200 through the light guide port B3, and then enters mainly the polarization splitting film 203. In the light having entered the polarization splitting film 203, the S-polarized light component with respect to the polarization splitting film 203 is reflected by the polarization splitting film 203 and the total reflection film 204, and thus the light path thereof is translated from the polarization beam splitter 201 toward the internal total reflection prism 202. Then, the S-polarized light component is emitted from the second region B2 as the illumination light. On the other hand, in the light having entered the polarization splitting film 203, the P-polarized light component with respect to the polarization splitting film 203 is transmitted through the polarization splitting film 203. The P-polarized light component having been transmitted through the polarization splitting film 203 is transmitted through the wave plate 206 to thereby be converted into the S-polarized light component, and is then emitted from the first region B1 as the illumination light.

However, in the configuration of inputting the light, which is emitted from the collimator lens unit, to the polarization conversion element 200, there arises the following problem.

That is, since the light from the collimator lens is collimated light, although the light emitted from the inner peripheral area of the collimator lens goes straight, and then enters the light guide port B3, the light emitted from the outer peripheral area of the collimator lens enters the outside of the light guide port B3, and is therefore reflected by the total reflection film 204 to the outside of the polarization conversion element 200. Therefore, there arises a problem that the use efficiency of the source light is lowered, which makes it difficult to increase the intensity of the illumination light. Therefore, it has been proposed that the reflecting film is disposed in the area outside the light guide port B3 of the light entrance surface S21, and the light having entered the area is reflected toward the solid-state light source device to thereby be reused as the source light. However, the effect thereof is not so significant.

Further, in such a configuration, although the illumination light emitted from the first region B1 is the light having proceeded straight while being transmitted through the polarization splitting film 203 and the wave plate 206, the illumination light emitted from the second region B2 is the light having passed through the reflection path from the polarization splitting film 203 toward the total reflection film 204. Therefore, the light path length of the illumination light emitted from the second region B2 corresponds to what is obtained by adding the length of the light path corresponding to the reflection path to the length of the light path through which the illumination light from the first region B1 has passed. Therefore, according to the law of illumination, the intensity of the illumination light emitted from the second region B2 is lower than the intensity of the illumination light emitted from the first region B1, and there arises a problem that there occurs the illuminance unevenness that the area irradiated with the light from the second region is darker than the area irradiated with the light from the first region.

SUMMARY

An advantage of some aspects of the invention is to provide an illumination device having a high use efficiency of the source light, and capable of irradiating the illumination object with the illumination light with high in-plane uniformity of the intensity. Another advantage of some aspects of the invention is to provide a projector superior in display quality equipped with such an illumination device.

An aspect of the invention is directed to an illumination device including a solid-state light source device, a pickup lens unit adapted to control a proceeding direction of light input from the solid-state light source device, and a polarization conversion element adapted to align a polarization direction of light emitted from a light exit surface of the pickup lens unit, wherein a lens constituting the light exit surface of the pickup lens unit is an aspherical lens having a light exit surface shaped like a rotationally symmetric shape centered on a light axis of the pickup lens unit when viewed from a direction of the light axis, and having a cross-section of an aspherical shape when cut with a plane parallel to the light axis, and the light exit surface of the aspherical lens has a function of collimating and then emitting light emitted from a center of the solid-state light source device in an area relatively near to the light axis, and emitting the light so as to converge toward the light axis in an area relatively far from the light axis.

According to the illumination device of the aspect of the invention, the light exit surface of the aspherical lens has a function of collimating and then emitting the light emitted from the center of the solid-state light source device in the area (inner peripheral area) relatively near to the light axis, and emitting the light so as to converge toward the light axis in the area (outer peripheral area) relatively far from the light axis. Therefore, it is possible to introduce not only the light emitted from the inner peripheral area of the aspherical lens but also the light emitted from the outer peripheral area thereof to the polarization conversion element with efficiency, thus the use efficiency of the source light is improved. Thus, it becomes possible to increase the intensity of the illumination light.

Further, apart of the light emitted from the outer peripheral area of the aspherical lens is directly introduced in the internal total reflection prism without passing through the polarization splitting film. The light directly entering the internal total reflection prism as described above does not affect the intensity of the illumination light emitted from the polarization beam splitter, but increases only the intensity of the illumination light emitted from the internal total reflection prism. Thus, it is possible to cancel out the intensity difference caused by the difference in light path length between the illumination light emitted from the polarization beam splitter and the illumination light emitted from the internal total reflection prism to thereby enhance the in-plane uniformity of the illumination light intensity.

In the aspect of the invention, it is preferable that a reflecting unit adapted to reflect the light, which proceeds toward outside of an irradiation area of an illumination object to be irradiated with the light emitted from the polarization conversion element, to inside of the irradiation area is disposed between the polarization conversion element and the illumination object.

According to this configuration, the light proceeding toward the outside of the irradiation area out of the light emitted from the polarization conversion element is reflected toward the inside of the irradiation area in mid-course, and it becomes possible to illuminate the periphery of the irradiation area with the reflected light. Thus, the illumination unevenness of making the periphery of the irradiation area darker can be eliminated.

In the aspect of the invention, it is preferable that the reflecting unit has a prismatic cylindrical shape having an inner surface formed as a reflecting surface, and is disposed so that one of opening sections faces to a light exit surface side of the polarization conversion element and the other of the opening sections faces to the irradiation area side of the illumination object.

According to such a reflecting unit, since the medium of the reflected light is air having relatively long air-equivalent optical path length, the display shadow of the polarization conversion element can be prevented from appearing in the irradiation area.

In the aspect of the invention, it is preferable that an aperture area of the one of the opening sections of the reflecting unit is larger than an aperture area of the other of the opening sections.

According to this configuration, the intensity of the illumination light in the irradiation area can be raised.

In the aspect of the invention, it is preferable that at least a part of the reflecting surface of the reflecting unit has a scattering property.

According to this configuration, since the light having entered the surface the reflecting film is reflected in diverse directions, it becomes possible to uniformly illuminate the periphery or the like of the irradiation area without unevenness using these reflected lights.

Another aspect of the invention is directed to a projector including an illumination device, a light modulation device adapted to modulate illumination light from the illumination device in accordance with image information, and a projection optical system adapted to project the modulated light from the light modulation device as a projection image, wherein the illumination device is the illumination device according to the aspect of the invention.

Therefore, according to the projector of the aspect of the invention, since the illumination light having high intensity and high in-plane uniformity of the intensity is emitted from the illumination device, superior display quality can be achieved.

In the aspect of the invention, it is preferable that the light modulation device is a single-panel liquid crystal light modulation device.

According to this configuration, it becomes possible to achieve downsizing of the projector.

DESCRIPTION OF EXEMPLARY EMBODIMENTS

Hereinafter, some embodiments of the invention will be described with reference to the accompanying drawings. The embodiments each show an aspect of the invention, but do not limit the scope of the invention, and can arbitrarily be modified within the technical concept of the invention. Further, in order for making each of the constituents easy to understand, the drawings explained hereinafter are different in scale size, number, and so on from the actual structures.
First Embodiment The illumination device and the projector according to the first embodiment of the invention will be explained.
Configuration of Projector Firstly, an example of the projector (the projector according to the present embodiment) to which the illumination device according to the present embodiment is applied will be explained.

Figure 1:
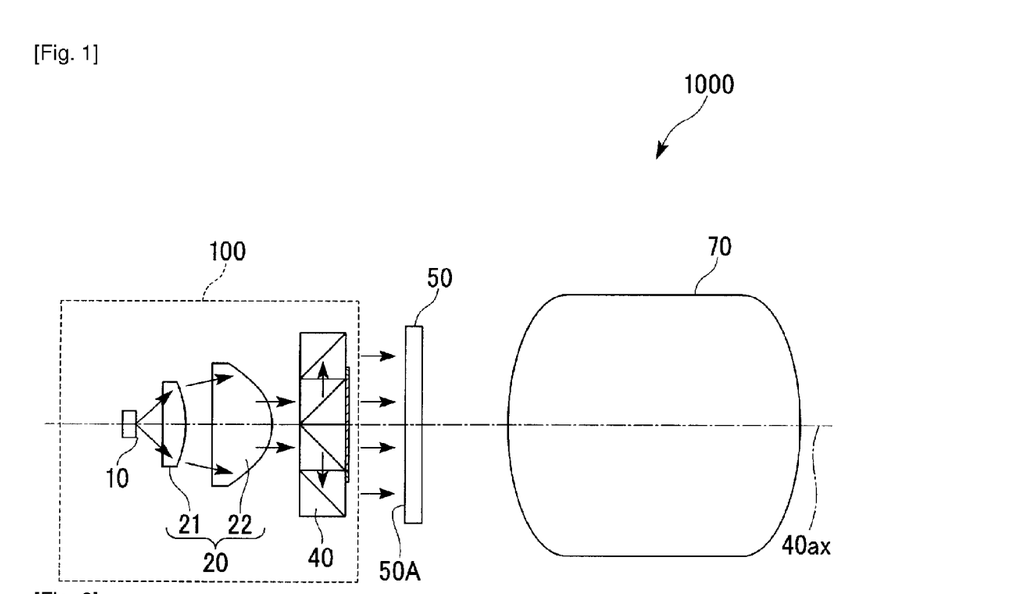
FIG. 1 is a schematic diagram showing a projector according to a first embodiment of the invention.
Figure 2:
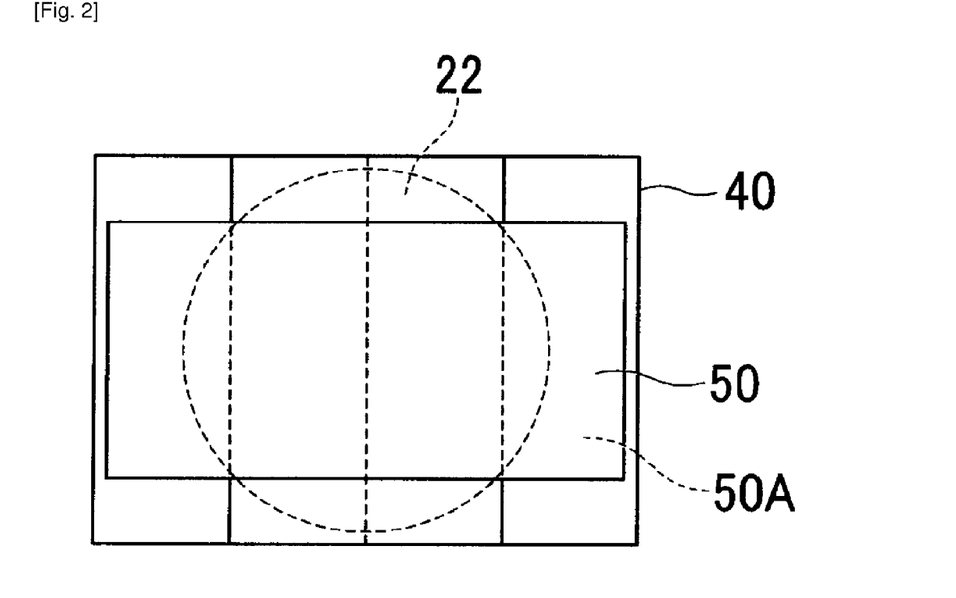
FIG. 2 is a front view of an illumination device and a liquid crystal light modulation device provided to the projector shown in FIG. 1.
Figure 3:
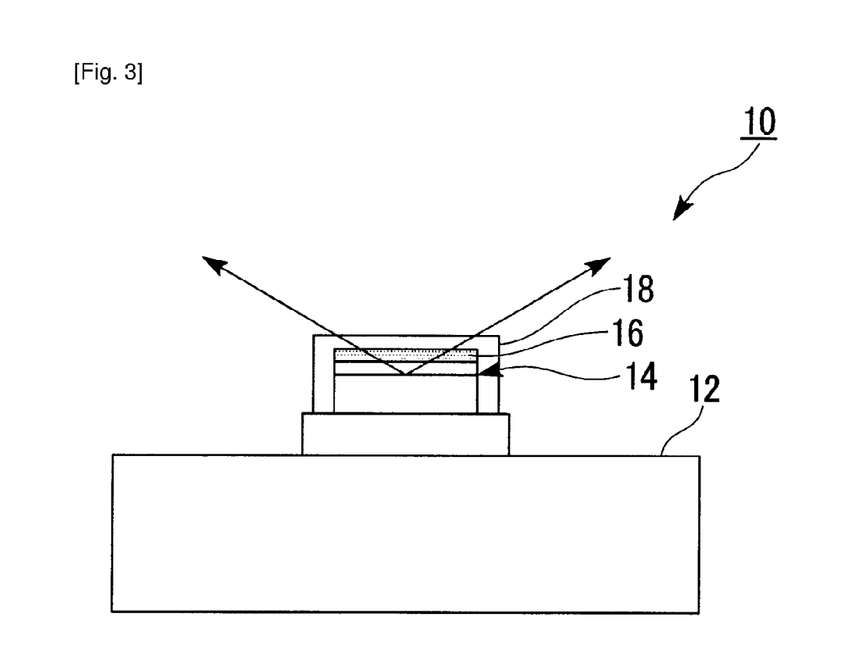
FIG. 3 is a cross-sectional view of a solid-state light source device provided to the projector shown in FIG. 1.
Figure 4:
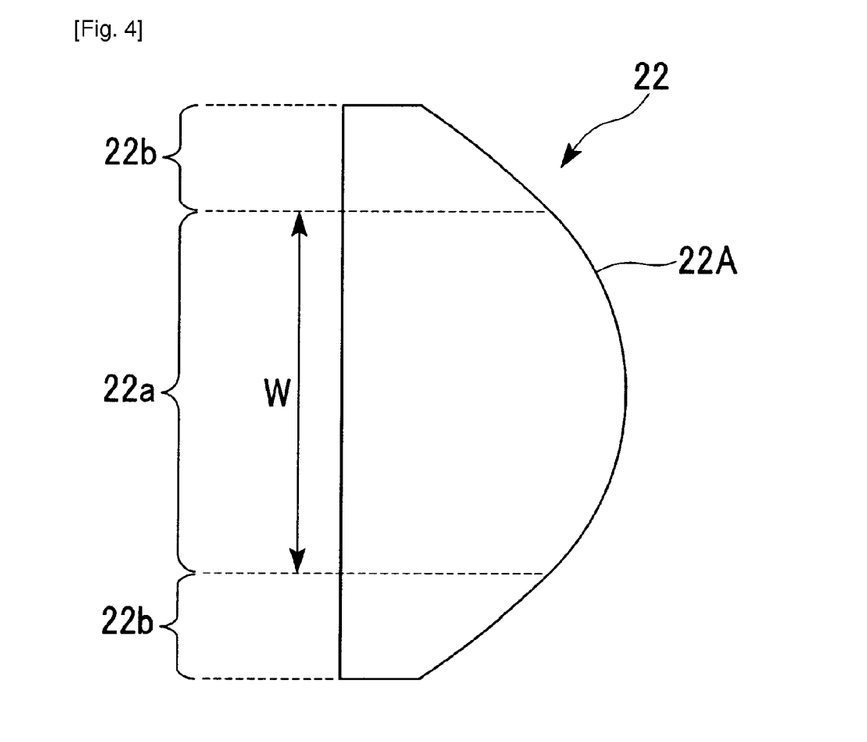
FIG. 4 is a schematic cross-sectional view of a second lens provided to the projector shown in FIG. 1.
Figure 5:
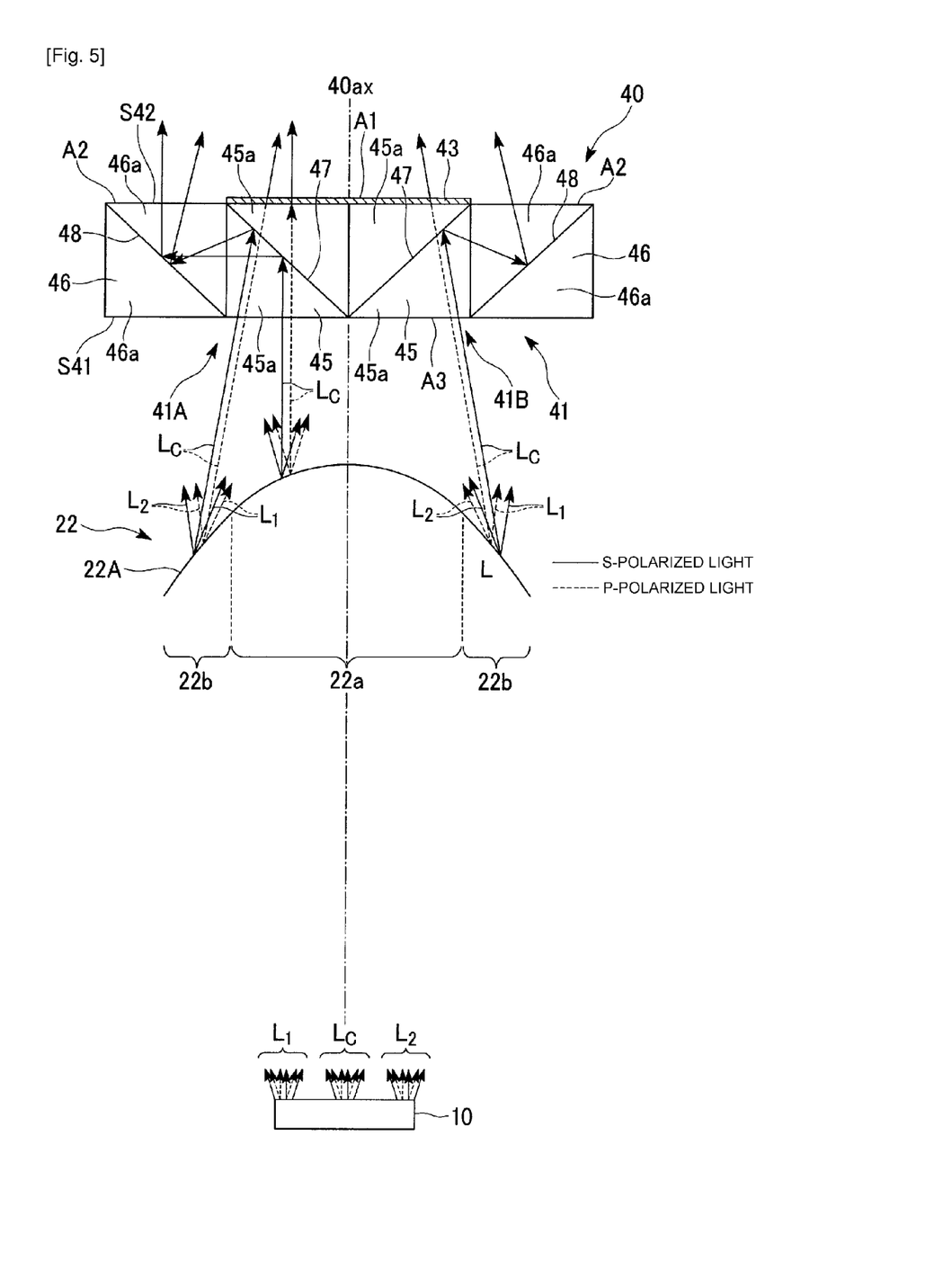
FIG. 5 is a schematic cross-sectional view showing the state in which the light enters a polarization splitting film of a polarization conversion element provided to the projector shown in FIG. 1.
Figure 6:
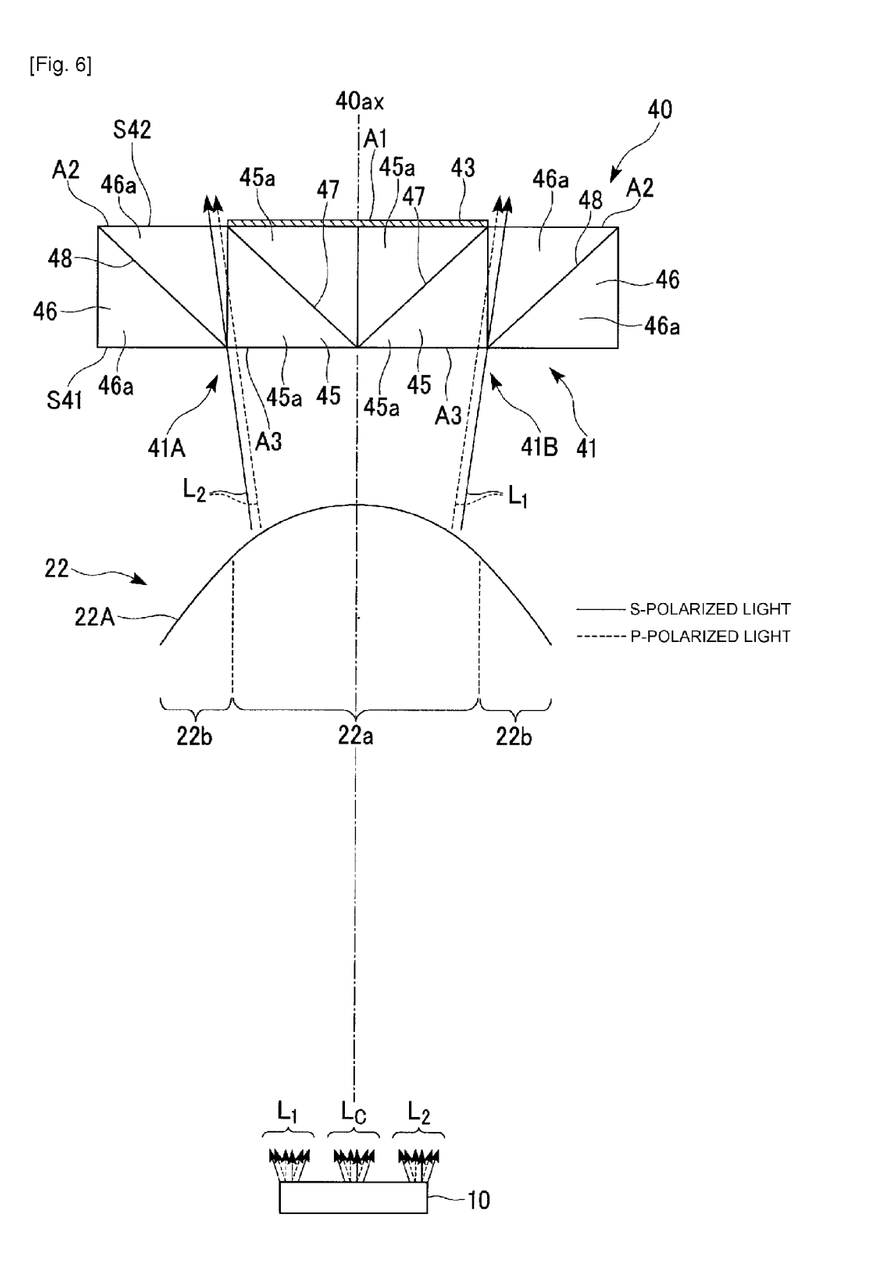
FIG. 6 is a schematic cross-sectional view showing the state in which the light directly enters an internal total reflection prism of the polarization conversion element provided to the projector shown in FIG. 1.
Figure 7:
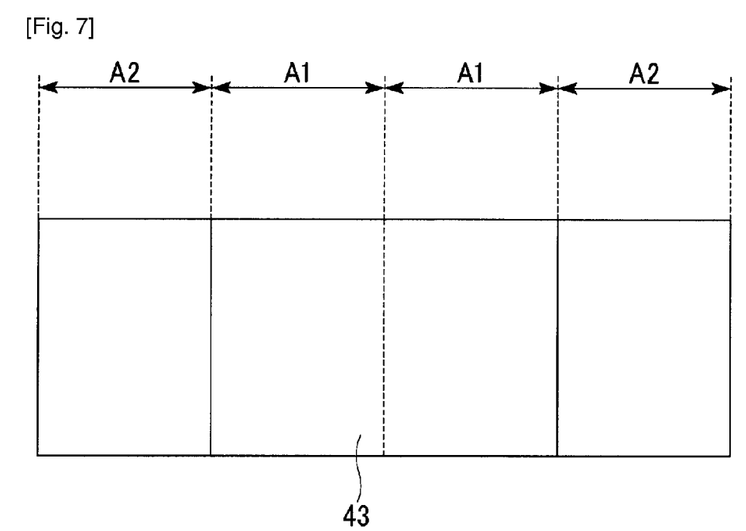
FIG. 7 is a plan view of the polarization conversion element shown in FIG. 5 viewed from the light exit surface side.

FIG. 1 is a schematic diagram showing the projector according to the embodiment of the invention, FIG. 2 is a front view of an illumination device and a liquid crystal light modulation device provided to the projector shown in FIG. 1, FIG. 3 is a cross-sectional view of a solid-state light source device provided to the projector shown in FIG. 1, FIG. 4 is a schematic cross-sectional view of a second lens provided to the projector shown in FIG. 1, FIG. 5 is a schematic cross-sectional view showing the state in which the light enters a polarization splitting film of a polarization conversion element provided to the projector shown in FIG. 1, FIG. 6 is a schematic cross-sectional view showing the state in which the light directly enters an internal total reflection prism of the polarization conversion element provided to the projector shown in FIG. 1, and FIG. 7 is a plan view of the polarization conversion element provided to the projector shown in FIG. 1 viewed from the light exit surface side.

It should be noted that in the following explanation, the right and left direction is referred to as a "lateral direction", and the up and down direction is referred to as a "vertical direction." Here, the rightward direction is a direction in which the S-polarized light having entered the first optical block along the illumination light axis 40*ax* is reflected by the polarization splitting film 47, and the leftward direction is a direction in which the S-polarized light having entered the second optical block along the illumination light axis 40*ax* is reflected by the polarization splitting film 47. The up and down direction is a direction parallel to the illumination light axis 40*ax*. It should be noted that in FIGS. 5 and 6, the first lens 21 is omitted from the drawings for the sake of simplification of the illustration. Further, in the present specification, the light polarized in a direction parallel to the plane of incidence to the polarization splitting film 47 is referred to as P-polarized light, and the light polarized in a direction perpendicular to the plane of incidence to the polarization splitting film 47 is referred to as S-polarized light.

As shown in FIG. 1, the projector 1000 according to the first embodiment is provided with the illumination device 100, the liquid crystal light modulation device 50, and a projection optical system 70. The illumination device 100 is formed of the illumination device according to the first embodiment.

The illumination device 100 has the solid-state light source 10, a pickup lens unit 20, and the polarization conversion element 40.

As shown in FIG. 3, the solid-state light source device 10 is a light emitting diode of a Lambertian emission type having a base 12, a solid-state light source 14, a fluorescent layer 16, and a sealing member 18, and emits white light (the source light) including red light, green light, and blue light. By using such a solid-state light source device 10, downsizing of the illumination device 100 and the projector 1000 can be achieved. It should be noted that although the solid-state light source device 10 also has lead wires and so on besides the constituents described above, the drawing and illustration thereof will be omitted.

As shown in FIG. 1, the pickup lens unit 20 is provided with a first lens 21 located on the side near to the solid-state light source device 10, and the second lens 22 located on the side far from the solid-state light source device 10. The pickup lens unit 20 controls the proceeding direction of the light input from the solid-state light source device 10. The second lens 22 forms the light exit surface of the pickup lens unit 20. It should be noted that although in FIG. 1 the pickup lens unit 20 is composed of the two lenses, the number of the lenses can be one, or more than two.

The first lens 21 is a planoconvex lens having a light entrance surface shaped like a flat plane and a light exit surface having a spherical shape, and has a function of reducing the spread angle of the light from the solid-state light source device 10.

As shown in FIG. 4, among the plurality of lenses constituting the pickup lens unit 20, the second lens 22 forming the light exit surface is an aspherical lens having a light entrance surface shaped like a flat plane and a light exit surface 22A having an aspherical shape. In the light exit surface of the second lens 22, the planar shape viewed from the direction of the illumination light axis 40*ax* of the pickup lens unit 20 is a rotationally symmetric shape centered on the illumination light axis 40*ax*, and the cross-sectional shape obtained by cutting it with a plane parallel to the illumination light axis 40ax is an aspherical shape. The light exit surface 22A of the second lens 22 has a function of collimating and then emitting the light, which has been emitted from the center of the solid-state light source device 10, in an area (hereinafter referred to as an "inner peripheral area 22a") relatively near to the illumination light axis 40ax, and emitting the light so as to converge toward the illumination light axis 40ax in an area (hereinafter referred to as an "outer peripheral area 22b") relatively far from the illumination light axis 40ax.

In the illumination device 100 of the present embodiment, since the second lens is provided with such a configuration, the use efficiency of the source light is raised to increase the intensity of the illumination light, and furthermore the in-plane uniformity of the illumination light intensity is improved to thereby make it possible to eliminate the illuminance unevenness in the irradiation area 50A. This functional mechanism will be described later in detail.

As the aspherical lens to form the second lens 22, there can specifically be cited a lens having the conic constant K fulfilling $-1 \leq K < 0$, namely the lens forming a paraboloidal surface or a horizontally-long elliptical surface, and so on.

The effective diameter W of the inner peripheral area 22a of the second lens 22 is preferably in a range of 3 mm through 10 mm. Thus, the advantage described above can surely be obtained, and the size thereof is compatible with the size required for the pico projector. Further, the curvature radius in the paraxial region of the inner peripheral area 22a is preferably in a range of 2 mm through 5 mm. Thus, it is possible to surly emit the light proceeding in parallel to the illumination light axis 40ax from the inner peripheral area 22a of the light exit surface 22A, and the size thereof is compatible with the size required for the pico projector.

The polarization conversion element 40 is for converting the light L input from the pickup lens unit 20 into the light mainly composed of the S-polarized light component.

As shown in FIG. 5, the polarization conversion element 40 has an optical block 41 composed of a first optical block 41A and a second optical block 41B, and a wave plate 43. The configuration of the first optical block 41A is the same as the configuration of the second optical block 41B, and the first optical block 41A and the second optical block 41B are each composed of a polarization beam splitter 45 and an internal total reflection prism 46. Further, the first optical block 41A and the second optical block 41B are disposed symmetrically about the illumination light axis 40ax. Therefore, in the following explanation, the first optical block 41A will mainly be explained.

The first optical block 41A has the polarization beam splitter 45 and the internal total reflection prism 46.

The polarization beam splitter 45 is composed of a pair of rectangular prisms 45a, 45a bonded to each other so that the respective tilted surfaces are opposed to each other, and a polarization splitting film 47 is disposed between the tilted surfaces bonded to each other. The polarization splitting film 47 is a film for reflecting the S-polarized light component toward the direction roughly perpendicular to the illumination light axis 40ax, and transmitting the P-polarized light component.

On the other hand, the internal total reflection prism 46 is composed of a pair of rectangular prisms 46a, 46a bonded to each other so that the respective tilted surfaces are opposed to each other, and a total reflection film 48 is disposed between the tilted surfaces bonded to each other. The total reflection film 48 is a film for reflecting the S-polarized light component and the P-polarized light component, and reflects the S-polarized light component, which has been reflected by the polarization splitting film 47, toward the direction roughly parallel to the illumination light axis 40ax.

The first optical block 41A is composed of the polarization beam splitter 45 and the internal total reflection prism 46 bonded to each other so that the plane of the polarization splitting film 47 and the plane of the total reflection film 48 are roughly parallel to each other. Further, the optical block 41 is composed of the first optical block 41A and the second optical block 41B bonded to each other so that the plane of the polarization splitting film 47 of the first optical block 41A forms an angle of about 90 degrees with the plane of the polarization splitting film 47 of the second optical block 41B. In the optical block 41, the respective polarization beam splitters 45 and the respective internal total reflection prisms 46 are arranged in the lateral direction in the order of the internal total reflection prism 46, the polarization beam splitter 45, the polarization beam splitter 45, and the internal total reflection prism 46.

Among the plurality of surfaces provided to such an optical block 41, the surface on the side where the tilted surfaces of the respective polarization beam splitters 45 have contact with each other forms a light entrance surface S41 to which the light L from the pickup lens unit 20 is input. Further, in the light entrance surface S41 of the optical block 41, each of the regions corresponding to the light entrance surfaces of the polarization beam splitters 45 constitutes a light guide port A3 through which the light L is introduced into the polarization conversion element 40. On the other hand, among the plurality of surfaces provided to the optical block 41, the surface opposed to the light entrance surface S41 forms a light exit surface S42 for emitting the light composed of the S-polarized light component.

It should be noted that in the following explanation, as shown in FIG. 7, in the light exit surface S42, each of the regions corresponding to the light exit surfaces of the polarization beam splitters 45 is referred to as a "first region A1." In other words, the first region A1 is a region of the light exit surface S42 overlapping the polarization splitting film 47 in a plan view when viewing the light exit surface S42 from a direction parallel to the illumination light axis 40ax. Further, in the light exit surface S42, each of the regions corresponding to the light exit surfaces of the internal total reflection prisms 46 is referred to as a "second region A2." In other words, the second region A2 is a region of the light exit surface S42 overlapping the total reflection film 48 in a plan view when viewing the light exit surface S42 from the direction parallel to the illumination light axis 40ax.

Each of the polarization splitting films 47 obliquely faces the first region A1 and the light guide port A3 so as to form an angle of about 45 degrees therewith.

Further, the wave plate 43 is disposed in a region of the light exit surface S42 overlapping the polarization beam splitters 45 in a plan view when viewing the light exit surface S42 from the direction parallel to the illumination light axis 40ax. The wave plate 43 is formed of a lambda/2 plate, and has a function of converting the P-polarized light component having been transmitted through the polarization splitting film 47 into the S-polarized light component by rotating the polarization direction of the P-polarized light component by 90 degrees. The basic configuration of the first optical block 41A is as described above, and the basic configuration of the second optical block 41B is substantially the same as the configuration described above.

In the polarization conversion element 40, the light L having entered the light guide ports A3 out of the light from the pickup lens unit 20 proceeds into the polarization beam splitter 45, and then enters the polarization splitting films 47. The S-polarized light component out of the light having entered the polarization splitting films 47 is reflected by the polarization splitting films 47 in the direction roughly perpendicular to the illumination light axis 40ax, and then enters the total reflection films 48. Further, the S-polarized light component having entered the total reflection films 48 is reflected by the total reflection films 48 in the direction roughly parallel to the illumination light axis 40ax. Thus, the light path of the S-polarized light component having been input from the light guide ports A3 is parallelly translated from the polarization beam splitters 45 toward the internal total reflection prisms 46, and the S-polarized light component is emitted as the S-polarized light from the second regions A2 of the light exit surface. Further, in the light having entered the polarization splitting films 47, the P-polarized light component is transmitted through the polarization splitting films 47. The P-polarized light component having been transmitted through the polarization splitting films 47 enters the wave plate 43, and is converted into the S-polarized light component, and is then emitted from the first regions A1 of the light exit surface. Therefore, the light having entered the polarization splitting films 47 from the light guide ports A3 of the polarization conversion element 40 is emitted as the S-polarized light component from the first regions A1 and the second regions A2, and the irradiation area of the liquid crystal light modulation device 50 is irradiated with the S-polarized light component.

The liquid crystal light modulation device 50 is for modulating the light input from the polarization conversion element 40 in accordance with the image information to thereby form a color image, and becomes the illumination object of the illumination device 100. As shown in FIG. 2, the liquid crystal light modulation device 50 is formed to have a dimension one size smaller than the polarization conversion element 40 in the plan view viewed from the front.

In the present embodiment, the liquid crystal light modulation device 50 is configured as a single transmissive panel of the reflective color filter (CF) type. Specifically, the liquid crystal light modulation device 50 is configured by sandwiching a reflective color filter, a liquid crystal element, and so on with a pair of glass substrates and bonding polarization plates respectively to the outer surfaces of the glass substrates. By adopting the single-panel system to the liquid crystal light modulation device 50 as described above, it becomes possible to downsize the projector 1000 compared to the three-panel system using the liquid crystal light modulation device for every colored light.

Each of the polarization plates is for transmitting either one of the S-polarized light component and the P-polarized light component, and has a configuration (the cross-Nicol arrangement) having the transmission axes perpendicular to each other. In the present embodiment, the polarization plate on the entrance side is formed of the S-transmission polarization plate, and the polarization plate on the exit side is formed of the P-transmission polarization plate.

The reflective color filter is composed of an R filter, a G filter, and a B filter provided to every pixel. The R filter, the G filter and the B filter transmit the red light, the green light, and the blue light, and reflect other colored lights, respectively. It should be noted that although the color filter has a color arrangement structure of the Bayer arrangement in the present embodiment, the arrangement is not limited thereto.

The liquid crystal element is obtained by airtightly encapsulating the liquid crystal as an electrooptic substance between the color filter and the glass substrate, and modulates the polarization direction of the linearly polarized light input thereto in accordance with the image information provided thereto using polysilicon TFT as the switching elements.

In the liquid crystal light modulation device 50, the linearly polarized light (the S-polarized light component in the present embodiment) from the polarization conversion device is transmitted through the polarization plate on the entrance side. The linearly polarized light having been transmitted through the polarization plate enters the color filter, and then only the colored light corresponding to the filter which the light has entered is transmitted through the filter. The colored light having been transmitted through the filter passes through the liquid crystal element, and thus the polarization direction thereof is modulated in accordance with the image information, and then the colored light (the colored light with the P-polarized light component in the present embodiment) with the polarization direction modulated is emitted from the polarization plate on the exit side. Therefore, in the liquid crystal light modulation device 50, by being irradiated with the linearly polarized light from the polarization conversion element 40, the color image corresponding to the image information is formed on the exit side thereof.

Then, the color image formed by the liquid crystal light modulation device 50 is projected in an enlarged manner by the projection optical system 70 to form an image on the screen.

Action of Projector

Then, the action of the projector 1000 will be explained.

Firstly, the action of each section is switched ON, and the solid-state light source device 10 is made to emit the light. Here, since the solid-state light source device 10 is not a point light source, the shift in the proceeding direction exists between the light emitted from the center and the light emitted from the periphery thereof as shown in FIG. 5. In the following explanation, the light emitted from the center of the solid-state light source device 10 may be referred to as "center light Lc", the light emitted from the left area of the center light Lc may be referred to as "first light L1", and the light emitted from the right area of the center light Lc may be referred to as "second light L2" in some cases.

The light L emitted from the solid-state light source device 10 enters the first lens 21, and the spread angle thereof is reduced by passing through the first lens 21.

The light from the first lens 21 enters the second lens 22. Since the second lens 22 has the light exit surface 22A having the aspherical shape described above as shown in FIG. 5, the center light Lc out of the light having entered the second lens 22 is emitted in the direction parallel to the illumination light axis 40ax from the inner peripheral area 22a of the light exit surface 22A, and is emitted obliquely with respect to the illumination light axis 40ax from the outer peripheral area 22b so as to converge on the illumination light axis 40ax. The center light Lc having been emitted from the inner peripheral area 22a directly proceeds, and then enters the light guide ports A3 of the polarization conversion element 40. Further, the center light Lc having been emitted from the outer peripheral area 22b proceeds obliquely so as to come closer to the illumination light axis 40ax, and partially enters the light guide ports A3 of the polarization conversion element 40.

On the other hand, the first light L1 has a larger incident angle in the left half of the light exit surface 22A than the center light Lc, and has a smaller incident angle in the right half of the light exit surface 22A than the center light Lc, and is therefore emitted in the direction with an angle increased clockwise from the exit direction of the center light Lc throughout the entire area including the right and left halves. Then, most of the first light L1 having been emitted from the inner peripheral area 22a and a part of the first light L1 having been emitted from the outer peripheral area 22b enter the light guide ports A3 of the polarization conversion element 40.

Further, the second light L2 has a larger incident angle in the right half of the light exit surface 22A than the center light Lc, and has a smaller incident angle in the left half of the light exit surface 22A than the center light Lc, and is therefore emitted in the direction with an angle increased counterclockwise from the exit direction of the center light Lc throughout the entire area including the right and left halves. Then, most of the second light L2 having been emitted from the inner peripheral area 22a and a part of the second light L2 having been emitted from the outer peripheral area 22b enter the light guide ports A3 of the polarization conversion element 40.

Then, most of the light having entered the light guide ports A3 enters the polarization splitting films 47. The S-polarized light component out of the light having entered the polarization splitting films 47 is reflected by the polarization splitting films 47 and the total reflection films 48, and is then emitted as the illumination light from the second regions A2. On the other hand, in the light having entered the polarization splitting films 47, the P-polarized light component is transmitted through the polarization splitting films 47. The P-polarized light component having been transmitted through the polarization splitting films 47 is transmitted through the wave plate 43 to thereby be converted into the S-polarized light component, and is then emitted as the illumination light from the first regions A1. Further, the light having entered the outside of the light guide ports A3 is reflected by the total reflection films 48 to the outside of the polarization conversion element 40.

Here, if the entire area of the light exit surface of the second lens 22 has a spherical shape of emitting the center light Lc in the direction parallel to the light axis of the center light Lc, the light emitted from the outer peripheral area out of the center light Lc proceeds straight to the areas outside the light guide ports A3, and is therefore reflected by the total reflection films 48 to the outside of the polarization conversion element 40, and is not used as the illumination light. Further, since the first light L1 and the second light L2 are emitted obliquely to the exit direction (the direction parallel to the light axis) of the center light Lc in the entire area including the right and left halves, the light having been emitted from the outer peripheral area partially enters the light guide ports A3 although the proportion is extremely small. However, most part of the light is reflected by the total reflection films 48 to the outside of the polarization conversion element 40. Therefore, if the entire area of the light exit surface of the second lens 22 is formed to have the spherical shape of emitting the center light Lc in the direction parallel to the light axis, the most part of the light emitted from the outer peripheral area fails to be used as the illumination light, and thus the use efficiency of the source light is degraded.

In contrast, in the embodiment of the invention, since the light exit surface 22A of the second lens 22 has the function of collimating and then emitting the center light Lc in the inner peripheral area 22a, and emitting the center light Lc so as to converge toward the illumination light axis 40ax in the outer peripheral area 22b, the lights Lc, L1, and L2 emitted from the outer peripheral area 22b proceed so as to come closer to the light axis, and then enter the light guide ports A3 efficiently. Therefore, the light emitted from the outer peripheral area 22b can also be used efficiently as the illumination light together with the light emitted from the inner peripheral area 22a, and therefore, it is possible to increase the intensity of the illumination light emitted from the polarization conversion element 40.

Further, as shown in FIG. 6, according to the second lens 22, apart of the first light L1 emitted from the outer peripheral area 22b on the right side, and a part of the second light L2 emitted from the outer peripheral area 22b on the left side proceed in the dispersing direction with a small spread angle and then directly enter the internal total reflection prisms 46 without entering the polarization splitting films 47.

The light entering the internal total reflection prisms 46 without passing through the polarization splitting films 47 as described above does not affect the intensity of the illumination light emitted from the first regions A1, but increases only the intensity of the illumination light emitted from the second regions A2. Thus, it is possible to cancel out the intensity difference caused by the difference in light path length between the illumination light emitted from the first regions A1 and the illumination light emitted from the second regions A2 to thereby enhance the in-plane uniformity of the illumination light intensity.

Figure 8:
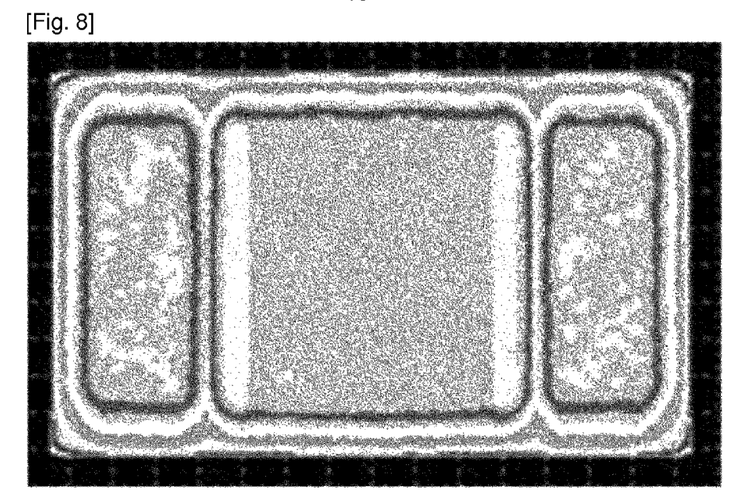
FIG. 8 is a photograph showing an illumination image obtained by the illumination device according to the embodiment.
Figure 9:
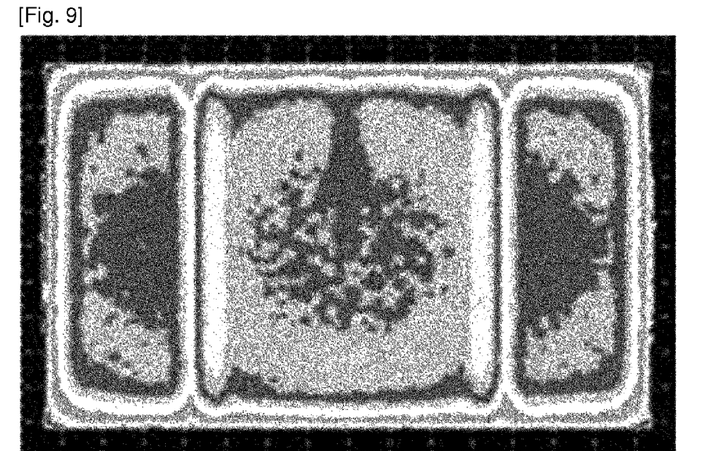
FIG. 9 is a photograph showing an illumination image in the case of using a lens having a spherical light exit surface as a second lens.

FIG. 8 is an illumination image of the light emitted from the illumination device according to the first embodiment, and FIG. 9 is an illumination image of the light in the case of using the collimator lens instead of the aspherical lens. According to the drawings, it is possible to confirm that the preferable illumination image with little unevenness can be obtained in the illumination device according to the first embodiment, since the aspherical lens is used.

Further, the irradiation area 50A of the liquid crystal light modulation device 50 is irradiated with the illumination light emitted from the polarization conversion element 40. The illumination light with which the irradiation area 50A is irradiated is separated into various colored lights and at the same time modulated in polarization direction by the liquid crystal light modulation device 50 in accordance with the image information, and is then emitted from the display surface. Thus, the color image corresponding to the image information is formed on the display surface of the liquid crystal light modulation device 50.

Then, the color image formed by the liquid crystal light modulation device 50 is projected in an enlarged manner by the projection optical system 70 to form the image on the screen. Here, in the present embodiment, since the intensity and the in-plane uniformity of the intensity of the illumination light emitted from the illumination device 100 are high, it becomes possible to display a bright and high-quality image having no variation in brightness.

As described above, since the illumination device 100 according to the embodiment of the invention has the light exit surface 22A of the second lens 22 having the aspherical shape rotationally symmetric about the illumination light axis 40ax, and has the function of collimating and then emitting the center light Lc in the inner peripheral area 22a, and converging the center light Lc toward the illumination light axis 40ax and then emitting the light in the outer peripheral area 22b, the use efficiency of the source light is raised to increase the intensity of the illumination light, and furthermore, the in-plane uniformity of the illumination light intensity is raised, and thus the illuminance variation of the irradiation area 50A can be eliminated.

Further, the projector 1000 according to the first embodiment equipped with such an illumination device 100 can display a bright and high-quality image having no unevenness in brightness.

Second Embodiment

Then, the illumination device and the projector according to the second embodiment of the invention will be explained. It should be noted that the second embodiment will be explained with a focus mainly on the differences from the first embodiment described above, and the explanation regarding substantially the same matters will be omitted.

Figure 10:
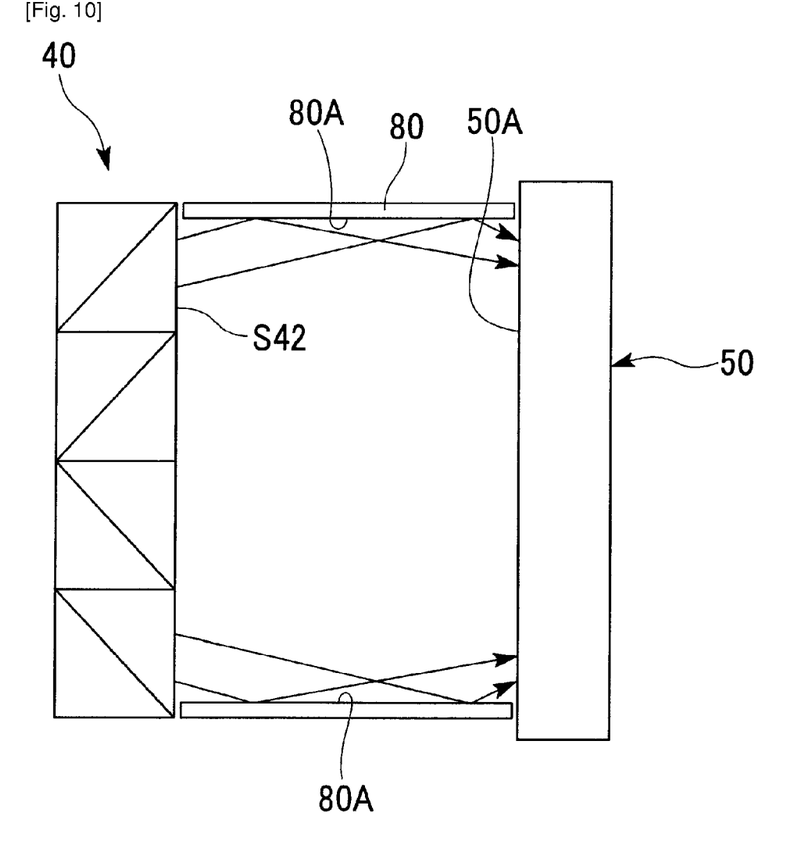
FIG. 10 is a schematic diagram showing a projector according to a second embodiment of the invention.
Figure 11:
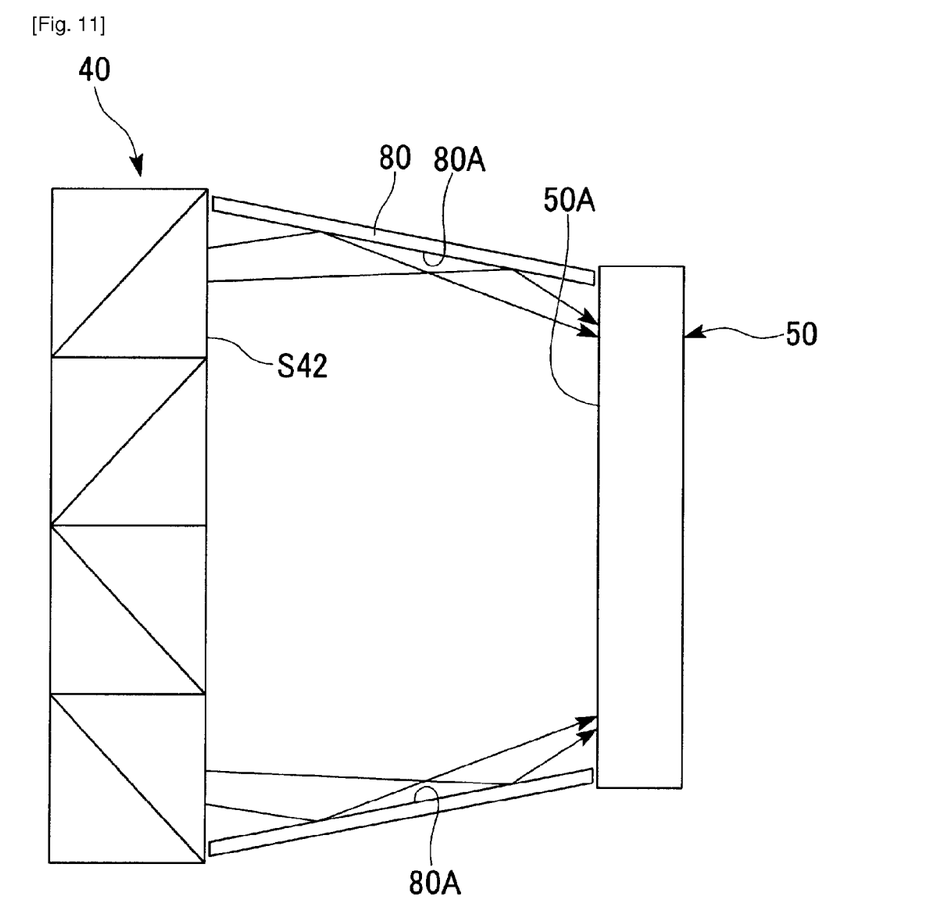
FIG. 11 is a schematic diagram showing a modified example of the projector according to the second embodiment.

FIG. 10 is a schematic diagram showing a polarization conversion element, a reflecting unit, and a light modulation device provided to the projector according to the second embodiment, and FIG. 11 is a schematic diagram showing a modified example of the reflecting unit provided to the projector according to the second embodiment.

The illumination device and the projector according to the second embodiment have each a configuration substantially the same as in the first embodiment except the point that the reflecting unit is disposed between the polarization conversion element and the liquid crystal light modulation device as an illumination object.

As shown in FIG. 10, the reflecting unit 80 is for reflecting the illumination light, which proceeds toward the outside of the irradiation area 50A of the liquid crystal light modulation device 50, toward the inside of the irradiation area 50A. As shown in FIG. 6, a part of the light L1, L2 emitted obliquely with respect to the illumination light axis 40ax at a small spread angle from the second region A2 without passing through the polarization splitting films 47 proceeds toward the outside of the irradiation area 50A of the liquid crystal light modulation device 50. The light having reached the outside of the irradiation area 50A does not make a contribution to the brightness of the irradiation area 50A, and therefore, causes in particular the illumination unevenness of making the periphery of the irradiation area 50A darker.

In order to cope therewith, by disposing the reflecting unit for reflecting the illumination light, which proceeds toward the outside of the irradiation area 50A of the liquid crystal light modulation device 50, toward the inside of the irradiation area 50A between the polarization conversion element 40 and the liquid crystal light modulation device 50, it is possible to illuminate the periphery of the irradiation area 50A effectively using the illumination light reflected inward by the reflecting unit 80. Thus, such an illumination unevenness described above can be eliminated, and it becomes possible to display a high-quality image.

As the reflecting unit 80, it is possible to adopt a hollow member (a light tunnel) obtained by disposing a reflecting film such as a metal film on the inner surface of a prismatic cylindrical body, or a rod lens having a rectangular cross-sectional shape. Such reflecting units are each disposed so that one end (one of opening sections) thereof faces to the light exit surface S42 side of the polarization conversion element 40, and the other end (the other of the opening sections) faces to the irradiation area 50A side of the liquid crystal light modulation device 50. Among these reflecting units, the hollow member is preferably used as the reflecting unit 80. Since air has longer air-equivalent optical path length than glass or the like constituting the rod lens, by using the hollow reflecting unit having air as the medium of the reflected light, the display shadows (shadows each having a linear shape and corresponding respectively to the edges of the polarization splitting films 47) of the polarization conversion element 40 can be prevented from appearing in the irradiation area 50A.

In the reflecting unit 80 of the hollow type, the reflecting film is preferably provided with a scattering property in at least a partial area. Thus, since the light having entered the surface of the reflecting film is reflected in diverse directions, it is possible to uniformly illuminate the periphery or the like of the irradiation area 50A without unevenness using these reflected lights. As the reflecting film superior in scattering property, there can be cited an aluminum coat, Miro Silver (product name, made by ALANOD Ltd.), and so on.

FIG. 11 shows a modified example of the reflecting unit. In the present modified example, the lateral length of the light exit surface S42 of the polarization conversion element 40 is larger than the lateral length of the irradiation area 50A. The reflecting unit 80 has reflecting surfaces 80A. The reflecting surfaces 80A are disposed obliquely to the illumination light axis 40ax so as to be aligned with the side surfaces of the polarization conversion element 40. By disposing the reflecting surfaces in such a manner as described above, it is possible to make the lateral length of one end surface of the reflecting unit 80 roughly equal to the lateral length of the light exit surface S42 of the polarization conversion element 40, and to make the lateral length of the other end surface of the reflecting unit 80 roughly equal to the lateral length of the irradiation area 50A. According to this configuration, since the aperture area of one of the opening sections (the opening section facing to the light exit surface S42 side of the polarization conversion element 40) of the reflecting unit 80 is larger than the aperture area of the other of the opening sections (the opening section facing to the irradiation area 50A side of the liquid crystal light modulation device 50), it is possible to make the light density in the irradiation area 50A higher than the light density in the light exit surface S42 of the polarization conversion element 40 to thereby increase the luminance of the display image.

It should be noted that in the light exit surface S42 of the polarization conversion element 40 and the one end surface of the reflecting unit 80, the dimension made to be greater than those of the irradiation area 50A and the other end surface of the reflecting unit 80 is not limited to the lateral dimension, but can be the vertical dimension, or both of vertical and lateral dimensions.

According also to the second embodiment, substantially the same functions and advantages as in the embodiment described above can be obtained.

Further, in the second embodiment, in particular, the reflecting unit 80 is disposed between the polarization conversion element 40 and the liquid crystal light modulation device 50, and therefore, the illumination light proceeding toward the outside of the irradiation area out of the illumination light emitted from the polarization conversion element 40 is reflected inward in midstream, and it is possible to illuminate the periphery of the irradiation area 50A with the reflected light. Thus, the illumination unevenness of making the periphery of the irradiation area 50A darker can be eliminated, and it becomes possible to display a higher-quality image.

Although the invention is explained hereinabove based on each of the embodiments, the invention is not limited to the configurations described above. The invention can be put into practice in various forms within the scope or the spirit of the invention, and further, the following modifications are also possible, for example.

(1) It is also possible to arrange that total reflection films are disposed in the areas outside the light guide ports A3 in the light entrance surface of the polarization conversion element. Thus, the light having entered these areas is reflected toward the solid-state light source device 10, and it becomes possible to reuse the light as the source light.

(2) In the polarization conversion element provided to the illumination device according to any one of the embodiments described above, the S-polarized light component and the P-polarized light component can be in an opposite relationship. Specifically, although in each of the embodiments described above the P-polarized light is defined as the first polarization state, it is also possible to define the S-polarized light as the first polarization state.

(3) The invention can be applied to a front projection projector for performing projection from the side of observing the projected image, and can also be applied to a rear projection projector for performing projection from the side opposite to the side of observing the projected image.

(4) Although in each of the embodiments described above, the example of applying the illumination device according to the invention to the projector is explained, the invention is not limited thereto. For example, the illumination device according to the invention can also be applied to other optical equipment (e.g., an optical disk drive, a headlight of a vehicle, and various types of lighting equipments).

The entire disclosure of Japanese Patent Application No. 2012-031849, filed on Feb. 16, 2012 is expressly incorporated by reference herein.

The invention claimed is:

1. An illumination device comprising:
a solid-state light source device;
a pickup lens unit adapted to control a proceeding direction of light input from the solid-state light source device; and
a polarization conversion element adapted to align a polarization direction of light emitted from an inner peripheral area of a light exit surface of the pickup lens unit, and an outer peripheral area of the light exit surface of the pickup lens unit, wherein
a lens constituting the light exit surface of the pickup lens unit is an aspherical lens having a light exit surface shaped like a rotationally symmetric shape centered on a light axis of the pickup lens unit when viewed from a direction of the light axis of the pickup lens unit, and having a cross-section of an aspherical shape when cut with a plane parallel to the light axis,
the light exit surface of the aspherical lens has a function of collimating and then emitting light emitted from a center of the solid-state light source device in an area relatively near to the light axis of the pickup lens unit in a direction parallel to the light axis of the pickup lens unit, and emitting obliquely with respect to the light axis of the pickup lens unit light from an outer peripheral area of the light exit surface, which is relatively far from the light axis of the pickup lens unit so as to converge toward the light axis of the pickup lens unit,
the axis of the light emitted from the outer peripheral area of the light exit surface of the aspherical lens is inclined with respect to the light axis of the pickup lens unit,
the light emitted from the outer peripheral area of the light exit surface of the aspherical lens gets closer to the light axis of the pickup lens unit as the light travels toward the polarization conversion element, and
a first portion of the light emitted from the outer peripheral area enters and passes through the polarization conversion element such that the axis of the first portion of the light emitted from outer peripheral area remains the same, while the axis of a second portion of the light emitted from the outer peripheral area is changed by the polarization conversion element.

2. The illumination device according to claim 1, wherein a reflecting unit adapted to reflect light, which proceeds towards outside of an irradiation area of an illumination object to be irradiated with the light emitted from the polarization conversion element, to inside of the irradiation area is disposed between the polarization conversion element and the illumination object.

3. The illumination device according to claim 2, wherein the reflecting unit has a prismatic cylindrical shape having an inner surface formed as a reflecting surface, and is disposed so that one of two opening sections faces to a light exit surface side of the polarization conversion element and the other of the two opening sections faces to the irradiation area side of the illumination object.

4. The illumination device according to claim 3, wherein an aperture area of the one of the two opening sections of the reflecting unit is larger than an aperture area of the other of the two opening sections.

5. The illumination device according to claim 2, wherein at least a part of the reflecting surface of the reflecting unit has a scattering property.

6. The illumination device according to claim 3, wherein at least a part of the reflecting surface of the reflecting unit has a scattering property.

7. The illumination device according to claim 4, wherein at least a part of the reflecting surface of the reflecting unit has a scattering property.

8. A projector comprising:
the illumination device according to claim 1;
a light modulation device adapted to modulate illumination light from the illumination device in accordance with image information; and
a projection optical system adapted to project modulated light from the light modulation device as a projection image.

9. A projector comprising:
the illumination device according to claim 2;
a light modulation device adapted to modulate illumination light from the illumination device in accordance with image information; and
a projection optical system adapted to project modulated light from the light modulation device as a projection image.

10. A projector comprising:
the illumination device according to claim 3;
a light modulation device adapted to modulate illumination light from the illumination device in accordance with image information; and
a projection optical system adapted to project modulated light from the light modulation device as a projection image.

11. A projector comprising:
the illumination device according to claim 4;
a light modulation device adapted to modulate illumination light from the illumination device in accordance with image information; and a projection optical system adapted to project modulated light from the light modulation device as a projection image.

12. A projector comprising:
the illumination device according to claim 5;
a light modulation device adapted to modulate illumination light from the illumination device in accordance with image information; and
a projection optical system adapted to project modulated light from the light modulation device as a projection image.

13. A projector comprising:
the illumination device according to claim 6;
a light modulation device adapted to modulate illumination light from the illumination device in accordance with image information; and
a projection optical system adapted to project modulated light from the light modulation device as a projection image.

14. A projector comprising:
the illumination device according to claim 7;
a light modulation device adapted to modulate illumination light from the illumination device in accordance with image information; and
a projection optical system adapted to project modulated light from the light modulation device as a projection image.

15. The projector according to claim 8, wherein the light modulation device is a single-panel liquid crystal light modulation device.

16. The illumination device according to claim 1, wherein
the polarization conversion element includes a first region that emits illumination light traveling along a first light path and a second region that emits illumination light traveling along a second light path,
the length of the second light path is longer than the length of the first light path, and
the polarization conversion element is configured so as to cancel out the intensity difference caused by the difference in light path length between the illumination light emitted from the first region and the illumination light emitted from the second region to thereby enhance the in-plane uniformity of the illumination light intensity.

17. An illumination device comprising:
a solid-state light source device;
a pickup lens unit adapted to control a proceeding direction of light input from the solid-state light source device; and
a polarization conversion element adapted to align a polarization direction of light emitted from a light exit surface of the pickup lens unit, wherein
a lens constituting the light exit surface of the pickup lens unit is an aspherical lens having a light exit surface shaped like a rotationally symmetric shape centered on a light axis of the pickup lens unit when viewed from a direction of the light axis of the pickup lens unit, and having a cross-section of an aspherical shape when cut with a plane parallel to the light axis,
the light exit surface of the aspherical lens has a function of collimating and then emitting light emitted from a center of the solid-state light source device in an area relatively near to the light axis, and emitting light from an outer peripheral area relatively far from the light axis of the pickup lens unit so as to converge toward the light axis of the pickup lens unit,
the axis of the light emitted from the outer peripheral area of the light exit surface of the aspherical lens is inclined with respect to the light axis of the pickup lens unit,
the light emitted from the outer peripheral area of the light exit surface of the aspherical lens gets closer to the light axis of the pickup lens unit as the light travels toward the polarization conversion element,
the polarization conversion element includes a first region that emits illumination light traveling along a first light path and a second region that emits illumination light traveling along a second light path,
the length of the second light path is longer than the length of the first light path,
the polarization conversion element is configured so as to cancel out the intensity difference caused by the difference in light path length between the illumination light emitted from the first region and the illumination light emitted from the second region to thereby enhance the in-plane uniformity of the illumination light intensity,
the first light path includes traveling through a polarization splitting film,
the second light path includes traveling so as to be reflected by a total reflection prism, and
a part of the light emitted from the outer peripheral area proceeds in the dispersing direction with a small spread angle and then directly enters the internal total reflection prism without entering the polarization splitting film.

18. An illumination device comprising:
a solid-state light source device;
a pickup lens unit adapted to control a proceeding direction of light input from the solid-state light source device; and
a polarization conversion element adapted to align a polarization direction of light emitted from an inner peripheral area of a light exit surface of the pickup lens unit, and an outer peripheral area of the light exit surface of the pickup lens unit, wherein
a lens constituting the light exit surface of the pickup lens unit is an aspherical lens having a light exit surface shaped like a rotationally symmetric shape centered on a light axis of the pickup lens unit when viewed from a direction of the light axis of the pickup lens unit, and having a cross-section of an aspherical shape when cut with a plane parallel to the light axis,
the light exit surface of the aspherical lens has a function of collimating and then emitting light emitted from a center of the solid-state light source device in an area relatively near to the light axis of the pickup lens unit in a direction parallel to the light axis of the pickup lens unit, and emitting obliquely with respect to the light axis of the pickup lens unit light from an outer peripheral area of the light exit surface, which is relatively far from the light axis of the pickup lens unit so as to converge toward the light axis of the pickup lens unit,
the axis of the light emitted from the outer peripheral area of the light exit surface of the aspherical lens is inclined with respect to the light axis of the pickup lens unit, the light emitted from the outer peripheral area of the light exit surface of the aspherical lens gets closer to the light axis of the pickup lens unit as the light travels toward the polarization conversion element, the polarization conversion element is composed of two optical blocks each with the same configuration composed of a polarization beam splitter provided with a polarization splitting film, and an internal total reflection prism provided with a total reflection film, and the optical blocks are disposed symmetrically about the illumination light axis of the illumination device.

19. The illumination device according to claim 18, wherein a tilted surface located inside the polarization beam splitter is provided with the polarization splitting film.

20. The illumination device according to claim 19, wherein the polarization splitting film reflects an S-polarized light component that is input from a light guide port of a light entrance surface, in a direction perpendicular to the illumination light axis, and at the same time transmits P-polarized light input from the light guide port.

* * * * *